J. B. SECOR.
VARIABLE LINE SPACE MECHANISM FOR TYPE WRITERS.
APPLICATION FILED NOV. 18, 1911.

1,033,125.

Patented July 23, 1912.
2 SHEETS—SHEET 1.

WITNESSES

INVENTOR

ATTORNEYS

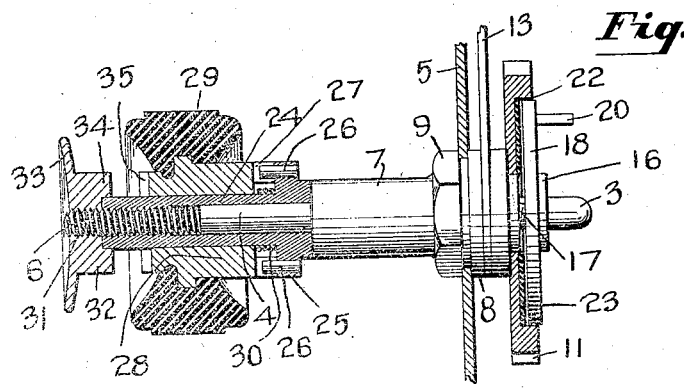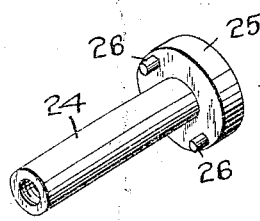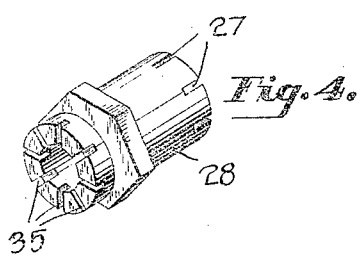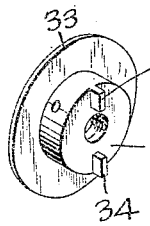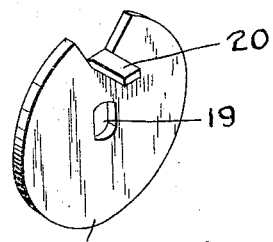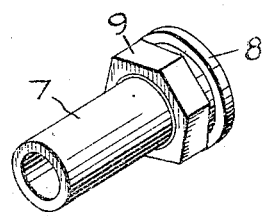

UNITED STATES PATENT OFFICE.

JEROME B. SECOR, OF DERBY, CONNECTICUT.

VARIABLE-LINE-SPACE MECHANISM FOR TYPE-WRITERS.

1,033,125.  Specification of Letters Patent.  Patented July 23, 1912.

Application filed November 18, 1911. Serial No. 661,061.

*To all whom it may concern:*

Be it known that I, JEROME B. SECOR, a citizen of the United States, residing at Derby, New Haven county, in the State of Connecticut, have invented certain new and useful Improvements in Variable-Line-Space Mechanism for Type-Writers, of which the following is a specification.

My invention relates to that class of mechanisms used on the paper carriages of typewriters, in connection with the regular line space mechanism, to enable the operator to throw off at will the connection of the platen to the regular line space mechanism, leaving the platen free to be turned by hand to any position desired, or to throw on again the connection to such regular line space mechanism for normal operation of the machine.

The object of the present improvement is the perfecting of the details of such mechanism as will appear more fully from the accompanying description—reference being made to the claims for the novel features and combinations.

Figure 1:
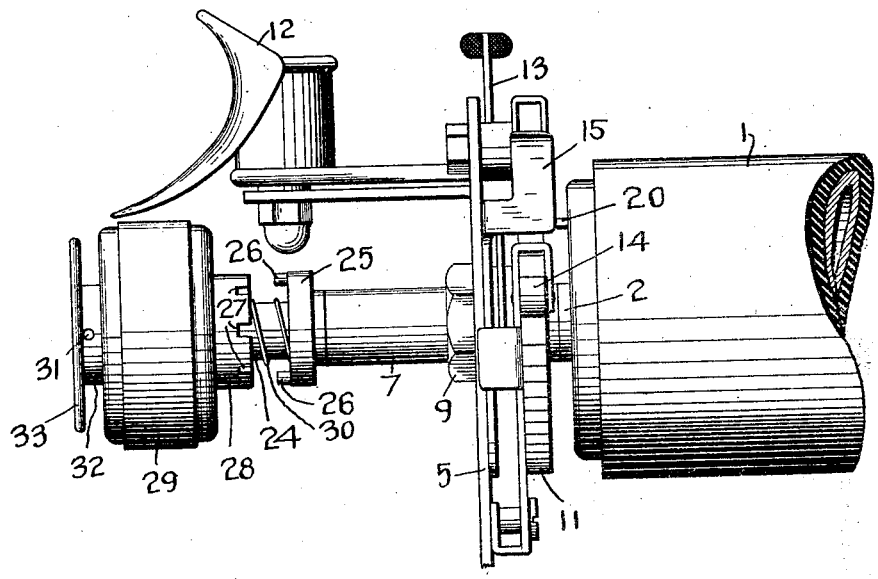
Figure 2:
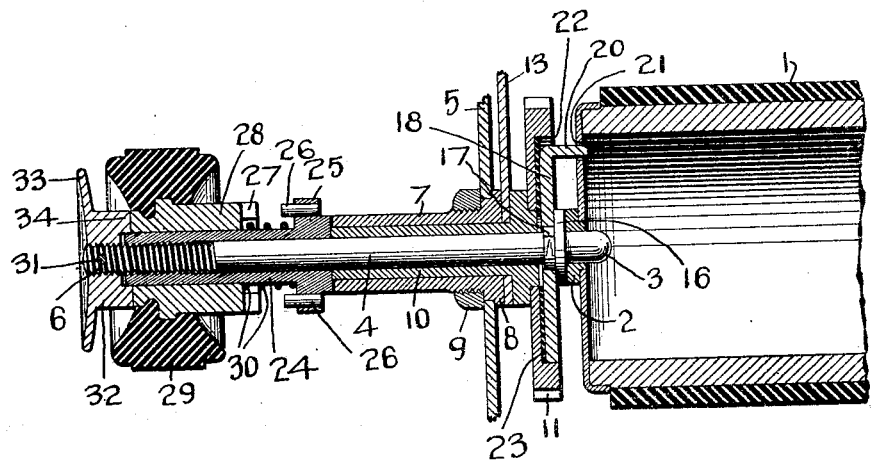

In the accompanying drawings Figure 1 is a front view of so much of one end (here, the left end) of a typewriter carriage as is necessary to the illustration of a preferred form of my invention. Fig. 2 is an axial sectional view thereof, the parts being shown in normal position, with the platen connected to the regular line space mechanism. Fig. 3 is an elevation, partly in axial section, of the same mechanism (omitting the platen), the parts being shown in the position assumed at the moment of throwing off the connection to the regular line space mechanism. Figs. 4 to 8 are detached perspective views of the several parts hereinafter more fully described.

The platen 1 is of any preferred construction, preferably provided with a rigidly attached hub 2 to engage the trunnion or pivot stud 3, on the inner end of a centering pin 4, which extends out beyond the carriage frame or platen housing (part of which is indicated at 5), and has at its outer end the screw thread 6. The general carriage construction is not shown, the invention not being limited to a particular form of such mechanism. An elongated bearing sleeve 7 is securely attached to the carriage frame or platen housing 5 by flange 8 and nut 9, and affords bearing for a loose sleeve 10 which has rigidly attached to its inner end the regular line space ratchet wheel 11, which is operated by hand lever 12 and intermediate mechanism not shown, to give to the platen, during the ordinary operation of the machine, the regular line-space rotation. At 13 is indicated the line-space adjusting lever and at 14 the holding pawl for the ratchet wheel, while at 15 is shown the lever for throwing off the holding pawl at will. These last named parts are not fully shown—their precise construction not being important to the understanding of the present invention. The sleeve 10 forms a bearing for the centering pin 4 which is free to rotate and have longitudinal movement therein except when coupled thereto in the manner hereinafter described. Rigidly attached to the pin 4 is a flanged collar 16 on the reduced portion 17 of which is mounted a clamping disk 18, held from turning on the collar in any desired way as for example by forming the part 17 with sides to engage a correspondingly shaped aperture 19 in the disk 18. The disk 18 has a tongue 20 to engage a hole or seat 21 in the end of the platen. This construction is such as to cause the pin 4, clamping disk 18 and the platen to always rotate together, but to enable the platen to be removed from the other parts at will when it is desired to take it out of the carriage. The line space ratchet wheel 11 is recessed as shown at 22 to receive the clamping disk 18, a broad flat surface being provided on the wall of the ratchet wheel against which the disk 18 may be clamped to cause these two parts to rotate together when desired. Preferably a friction surface of fibrous or other suitable material 23 is interposed between the two clamping surfaces.

In the normal operation of the machine the platen is locked to the line space ratchet wheel 11 by the clamping together of the parts 18 and 11. To accomplish this there is placed upon the pin 4 a sleeve nut 24 whose interior screw thread engages the exterior screw thread 6 of the pin 4. When the sleeve nut 24 is turned upon the pin therefore in one direction, it draws the pin 4 out by engaging the end of sleeve 10, thus forcing the clamping disk 18 into contact with the clamping surface of the ratchet wheel. When the sleeve nut 24 is turned in the other direction it releases the clamping surfaces, so that the platen may turn free of the line space ratchet wheel. Preferably the sleeve nut 24 is turned by the following means: There is formed upon said nut a flange 25 having pins 26 adapted to be engaged by a crown clutch 27 on the hub 28 of a thumb wheel 29 when the latter is pressed to the right. The said hub is guided by engagement with the sleeve nut 24 and is normally pressed away from the pins 26 by spring 30.

There is fastened upon the left hand end of pin 4, preferably by being screwed thereon and held by key 31, a nut 32 preferably having the dish shaped flange 33, and the opposing surfaces of said nut and of the hub 28 have interlocking clutch members, as for example, the toothed shaped projections 34 on the nut and the crown clutch 35 on the hub.

In operation, the hub of the thumb wheel 29 being caused to engage with the nut 32 by means of the spring 30, the turning of the thumb wheel 29 turns the nut 32, the pin 4, the clamping disk 18 and the platen, and also, the clamping surfaces being normally engaged, the line space ratchet wheel 11, but if the thumb wheel 29 be forced to the right so as to engage clutch members 27, and then turned while the right hand end of the platen is held by its usual thumb wheel, the sleeve nut 24 is rotated, releasing as before described the clamping surfaces 18 and 11. The thumb wheel may now be used to turn the platen without affecting the line space ratchet wheel, either by keeping it engaged with the pins 26 or by allowing it to be forced back by the spring 30 in engagement with the nut 32.

What I claim is:

1. In mechanism of the character described, the combination with a regular line space ratchet wheel having a clamping surface, a disk adapted to be clamped to said surface, a platen, means holding said disk and platen against relative rotation, and means for clamping the disk to said clamping surface, comprising an endwise movable pin and a nut threaded thereon, and a thumb wheel movable endwise, in one position locked to said nut, and in the other position locked to the endwise movable pin, substantially as described.

2. The combination with a platen, an endwise movable pin for said platen, a line space ratchet wheel on said pin, a clamp disk mounted upon said pin to rotate therewith and also constrained to rotate with said platen, a clutch member adapted to impart endwise movement to said pin to secure said disk and ratchet wheel together, a second clutch member secured to said pin to rotate said platen, and a thumb wheel movable successively into engagement with said clutch members.

3. In mechanism of the character described, the combination of a line space ratchet wheel, a platen, clamping mechanism for locking the line space ratchet wheel and platen together, and mechanism for actuating such clamping mechanism, comprising an endwise movable pin having a sleeve nut thereon and a nut fixed thereto, said sleeve nut having a clutch member, and an endwise movable thumb wheel having means for engaging in its two positions respectively the said clutch member, and the said nut which is fixed on the endwise movable pin.

4. In mechanism of the character described, the combination of a line space ratchet wheel, means for locking it to the platen, an endwise movable pin for actuating said locking means, a sleeve nut threaded on said pin and bearing a clutch member, a clutch member on the outer end of said pin, a thumb wheel axially movable on said sleeve nut, means for engaging it at will with the clutch member of said pin or with the clutch member of the sleeve nut, and a spring for causing its normal engagement with the clutch member of said pin.

5. The combination with a platen, of a line space ratchet wheel, means for locking said platen and ratchet wheel against relative angular movement, a clutch member for operating said locking means, a second clutch member adapted to turn the platen independently of said ratchet wheel, and a thumb wheel adapted to alternately engage the clutch member for operating the locking means and said clutch member for moving said platen independently of the ratchet wheel.

6. In mechanism of the character described, the combination of a line space ratchet wheel, a bearing sleeve to which it is attached, a clamping disk, a pivot pin connected to rotate with said clamping disk and having bearing in said bearing sleeve, a sleeve nut threaded to said pin and having a clutch member, a nut fixed on said pin and having a clutch member, and a thumb wheel having bearing on said sleeve nut and having a clutch member on each side to engage at will with the clutch member of the sleeve nut or of the pivot pin, substantially as described.

7. The combination with a platen, of a line space ratchet wheel, means for locking said wheel to the platen including a clutch member, a second clutch member adapted to turn the platen independently of said ratchet wheel, a thumb wheel provided with clutch members adapted to alternately engage the first mentioned clutch members, and means normally holding said thumb wheel in operative engagement with one of said clutch members.

8. In a mechanism of the character described, the combination of a line space ratchet wheel, means for locking it to the platen, an endwise movable pin actuating said locking means, a clutch member movable relatively to said pin and platen and adapted to move said pin axially, a clutch member fixed to said pin, and a thumb wheel provided with clutches adapted to engage the other clutches respectively.

JEROME B. SECOR.

Witnesses:
F. COCKERS,
FRED EBEL.

Copies of this patent may be obtained for five cents each, by addressing the "Commissioner of Patents Washington, D. C."